United States Patent
Kojima et al.

(10) Patent No.: US 8,783,311 B2
(45) Date of Patent: Jul. 22, 2014

(54) TIRE WITH RECESSED PORTIONS FORMED ON BUTTRESS PORTION

(75) Inventors: Takaaki Kojima, Higashimurayama (JP); Yukihiro Kiwaki, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 65 days.

(21) Appl. No.: 13/393,115

(22) PCT Filed: Jan. 28, 2010

(86) PCT No.: PCT/JP2010/051107
§ 371 (c)(1),
(2), (4) Date: May 8, 2012

(87) PCT Pub. No.: WO2011/024492
PCT Pub. Date: Mar. 3, 2011

(65) Prior Publication Data
US 2012/0211135 A1    Aug. 23, 2012

(30) Foreign Application Priority Data

Aug. 31, 2009  (JP) ................... 2009-200815
Jan. 15, 2010  (JP) ................... 2010-006954

(51) Int. Cl.
B60C 11/01  (2006.01)
B60C 13/02  (2006.01)

(52) U.S. Cl.
USPC ................... 152/209.16; 152/523

(58) Field of Classification Search
USPC ............................. 152/209.16, 523
See application file for complete search history.

(56) References Cited

U.S. PATENT DOCUMENTS

D193,699 S  *  9/1962  Dodson ............... D12/591
4,152,186 A  *  5/1979  Shibata ............... 152/209.16

FOREIGN PATENT DOCUMENTS

| EP | 1074404 A1 | 2/2001 |
|---|---|---|
| JP | 62-029402 A * | 2/1987 |
| JP | 04-238703 A * | 8/1992 |
| JP | 10-147113 A | 6/1998 |
| JP | 2000-006615 A | 1/2000 |
| JP | 2000-016030 A * | 1/2000 |

(Continued)

OTHER PUBLICATIONS machine translation for Japan 2000-016030.*

(Continued)

Primary Examiner — Steven D Maki
(74) Attorney, Agent, or Firm — Sughrue Mion, PLLC (57) ABSTRACT

A pneumatic tire (1) comprises a tread (50), side walls (60), and buttress portions (70). In a cross-section of the pneumatic tire (1) in the tread width direction (TW), if the point at which a first curved line (R1) which follows the curvature of the surface of the tread (50) and a second curved line (R2) which follows the curvature of the surface of a buttress portion (70) intersect is defined as an imaginary point (IP) and also if the point at which a straight line (L) passing through the imaginary point (IP) and substantially perpendicular to the carcass (20) intersects the surface of the pneumatic tire (1) is defined as an intersection point (NP), the pneumatic tire (1) has a recessed shoulder region (US) including the intersection point (NP) and having a predetermined width. The recessed shoulder region (US) is provided with recesses (80) recessed from the surface of the pneumatic tire (1) and also with a surface portion (90) in which no recess (80) is formed. The recessed shoulder region (US) extends in the tire circumference direction (TC).

9 Claims, 8 Drawing Sheets (56) References Cited

FOREIGN PATENT DOCUMENTS

| | | | |
|---|---|---|---|
| JP | 2002-205514 A | * | 7/2002 |
| JP | 2005-081919 A | | 3/2005 |
| JP | 2006-117080 A | | 5/2006 |
| JP | 2007-106255 A | | 4/2007 |
| JP | 2008-024048 A | | 2/2008 |

OTHER PUBLICATIONS

International Search Report of PCT/JP2010/051107 dated Apr. 20, 2010.

Extended European Search Report dated Mar. 5, 2013 issued in European Patent Application No. 10811545.2-1760.

* cited by examiner

TIRE WITH RECESSED PORTIONS FORMED ON BUTTRESS PORTION

CROSS REFERENCE TO RELATED APPLICATIONS

This application is a National Stage of International Application No. PCT/JP2010/051107 filed Jan. 28, 2010, claiming priority based on Japanese Patent Application Nos. 2009-200815, filed Aug. 31, 2009 and 2010-006954, filed Jan. 15, 2010, the contents of all of which are incorporated herein by reference in their entirety.

TECHNICAL FIELD

The present invention relates to a tire having a tread which contacts the road surface, side walls provided on the inner side, in the tire radial direction, of the tread, and a buttress portion provided between the tread and the side walls.

BACKGROUND ART

Conventionally, in tires mounted on vehicles such as a passenger vehicle, various methods have been used to reduce road noise generated when the tire rolls on a road surface having irregular dents and bumps, such as a paved road with a rough road surface. For example, there is known a tire using rubber with high stiffness in the shoulder portion of the tread (refer to Patent Document 1).

With such a tire, deformation of the tread can be suppressed when the bumps, of the dents and bumps of the road surface, wedge into the tread. Due to this, the increase of the contact pressure of the tread is suppressed, and the increase of road noise when the tire rolls on a rough road surface is suppressed.

PRIOR ART DOCUMENT

Patent Document

Patent Document 1: Japanese Unexamined Patent Application Publication No. 2008-24048 (Page 5, FIG. 1)

SUMMARY OF THE INVENTION

Incidentally, nowadays, as a result of progress in the intensive study on the mechanism of road noise generated, it has been made clear that due to dents and bumps of the road surface, the vibration of the buttress portion is also a cause of road noise.

In other words, when the road surface is smooth, the buttress portion does not contact the road surface. On the other hand, when there are small dents and bumps on the road surface, such as a paved road with a rough road surface, the buttress portion does contact the road surface, and due to these dents and bumps, the buttress portion vibrates. Vibration of the buttress portion like this increases road noise.

Therefore, an object of the present invention is to provide a tire which further reduces road noise by suppressing the generation of road noise due to the vibration of the buttress portion.

To solve the above problem, the present invention has following features. A first feature of the present invention is summarized as a tire (pneumatic tire 1), comprising: a tread (tread 50) which contacts a road surface and is provided on an outer side of the carcass in a tire radial direction; side walls (side walls 60) provided on an inner side of the tread in the tire radial direction; and a buttress portion (buttress portion 70) provided between the tread and the side walls, wherein a recessed shoulder region (recessed shoulder region US) is provided on the buttress portion, the recessed shoulder region having a predetermined width and extending along the tire circumference direction, and on the recessed shoulder region, formed are a plurality of recessed portions (recessed portions 80) recessed from a surface of the tire, and a surface portion (surface portion 90) where the recessed portions are not formed, and a ratio of an area occupied by the recessed portions in the recessed shoulder region is equal to or greater than 60%.

Here, the recessed shoulder region denotes the portion which does not contact the road surface when the tire is rolling, in a condition where the proper internal pressure and a proper load are applied to the tire. Furthermore, the proper internal pressure is the air pressure corresponding to the maximum loading capability set forth in the 2008 edition of the Year Book of the JATMA (Japan Automobile Tyre Manufacturers Association). The proper load is the load that corresponds to the maximum loading capability when a single wheel is applied, set forth in the 2008 edition of the Year Book of the JATMA (Japan Automobile Tyre Manufacturers Association). Outside of Japan, the proper internal pressure is the air pressure corresponding to the maximum load (maximum loading capability) of a single wheel described in the specifications mentioned below. The proper load is the maximum load (maximum loading capability) of a single wheel in the applicable size described in the specifications mentioned below. The specification is determined by industrial standards effective in regions where the tire is manufactured or used. For example, this would be the "Year Book of The Tire and Rim Association Inc." in the United States of America, and the "Standards Manual of The European Tire and Rim Technical Organization" in Europe.

According to such feature, a recessed shoulder region having a predetermined width extends along the tire circumference direction TC, and on the recessed shoulder region, a plurality of recessed portions and a surface portion are formed. By this, even in cases where there are small dents and bumps on the road surface, the dents and bumps of the road surface do not contact the recessed portions, and the area of the recessed shoulder region which contacts the road surface is reduced. For this reason, the increase of the contact pressure of the tread is suppressed, and the vibration of the recessed shoulder region due to the dents and bumps of the road surface is suppressed. Accordingly, the generation of road noise due to the vibration of the recessed shoulder region can be suppressed, and as a result, a tire further reducing road noise can be provided.

Especially, compared to cases where the recessed portions take up less than 60% of the recessed shoulder region, suppression of the reduction in shearing rigidity of the recessed shoulder region and reduction of the area of the recessed shoulder region which contacts the road surface can both be managed. Due to this, while suppressing the generation of road noise, qualities such as controlling stability and cornering performance can be maintained.

A second feature of the present invention according to the first feature is summarized as that in the surface of the tire, a width of the recessed shoulder region along the tire radial direction is represented by L1, and a length of the recessed shoulder region along the tire circumference direction is represented by L2, a volume of the recessed portions is represented by V, and a depth of a deepest portion of the recessed portions is represented by D, the relation of $V \geq L1 \cdot L2 \cdot (D/2)$ is satisfied.

A third feature of the present invention according to the first feature or the second feature is summarized as that the surface portion is formed surrounding each of the recessed portions.

A forth feature of the present invention according to the first feature is summarized as that the recessed portion is polygonal on the surface of the tire.

A fifth feature of the present invention according to the fourth feature is summarized as that a side (side 81) forming the recessed portion is slanted in relation to the tire circumference direction on the surface of the tire.

A sixth feature of the present invention according to the fourth feature or the fifth feature is summarized as that the number of line segments (line segments BL) formed on a bottom surface of the recessed portion along a deepest portion (deepest portion 82) of the recessed portion is less than the number of sides forming recessed portion.

A seventh feature of the present invention according to the fourth feature is summarized as that a bottom surface (bottom surface 83) of the recessed portion is formed by only a curved surface.

An eight feature of the present invention according to the fourth feature is summarized as that the recessed portion is quadrilateral.

A ninth feature of the present invention according to the eighth feature is summarized as that line segments formed on the bottom surfaces of the recessed portion along a deepest portion of the recess, are formed in a position which is a diagonal along the tire circumference direction.

A tenth feature of the present invention according to the third feature is summarized as that the surface portions are latticed on the surface of the tire.

An eleventh feature of the present invention according to the first feature is summarized as that the recessed portion is formed in a plurality in a tread width direction.

A twelfth feature of the present invention according to the eleventh feature is summarized as that a depth of the recessed portions formed on the outer side in the tread width direction, is less than a depth of the recessed portions formed on the inner side in the tread width direction.

A thirteenth feature of the present invention according to the first feature is summarized as that, in the cross section along the tread width direction (tread width direction TW) and the tire radial direction (tire radial direction TR) of the tire, when a point where a first curved line (first curved line R1) and a second curved line (second curved line R2) intersects is defined as an imaginary point (imaginary point IP), the first curved line extending towards the outer side in the tread width direction along with a curvature of the surface of the tread, the second curved line extending towards the outer side in the tire radial direction along with a curvature of the surface of the buttress portion, and a point where a straight line (straight line L) intersects with the surface of the tire is defined as an intersection point (intersection point NP), the straight line passing through the imaginary point and being approximately perpendicular to the carcass, the recessed shoulder region includes the intersection point.

A fourteenth feature of the present invention according to the first feature is summarized as that, in the cross section along the tread width direction (tread width direction TW) and the tire radial direction (tire radial direction TR) of the tire, when a point where a first curved line (first curved line R1) and a second curved line (second curved line R2) intersects is defined as an imaginary point (imaginary point IP), the first curved line extending towards the outer side in the tread width direction along with a curvature of the surface of the tread, the second curved line extending towards the outer side in the tire radial direction along with a curvature of the surface of the buttress portion, and a point where a straight line (straight line L) intersects with the surface of the tire is defined as an intersection point (intersection point NP), the straight line passing through the imaginary point and being approximately perpendicular to the carcass, the recessed shoulder region is positioned on the outer side of the intersection point in the tread width direction.

A fifteenth feature of the present invention according to the first feature is summarized as that the recessed shoulder region is positioned on the inner side when the tire is mounted on the vehicle.

According to the features of the present invention, the generation of road noise due to the vibration of the buttress portion can be suppressed, and a tire further reducing road noise can be provided.

MODES FOR CARRYING OUT THE INVENTION

Next, embodiments of a pneumatic tire according to the present invention will be explained while referring to the drawings. Specifically, a first embodiment, a second embodiment, and other embodiments will be explained.

In the following description of the drawings, the same or similar reference numerals are used to designate the same or similar parts. It will be appreciated that the drawings are schematically shown and the ratio and the like of each dimension are different from the real ones.

Therefore, a specific dimension should be determined in view of the following description. Moreover, among the drawings, the respective dimensional relations or ratios may differ.

[First Embodiment]

In the following, a pneumatic tire 1 according to a first embodiment will be explained. Specifically, (1) Overall configuration of pneumatic tire, (2) Detailed configuration of recessed shoulder region, (3) Comparative evaluations, (4) Operation and effect, and (5) Modifications will be explained.

(1) Overall Configuration of Pneumatic Tire

Figure 1:
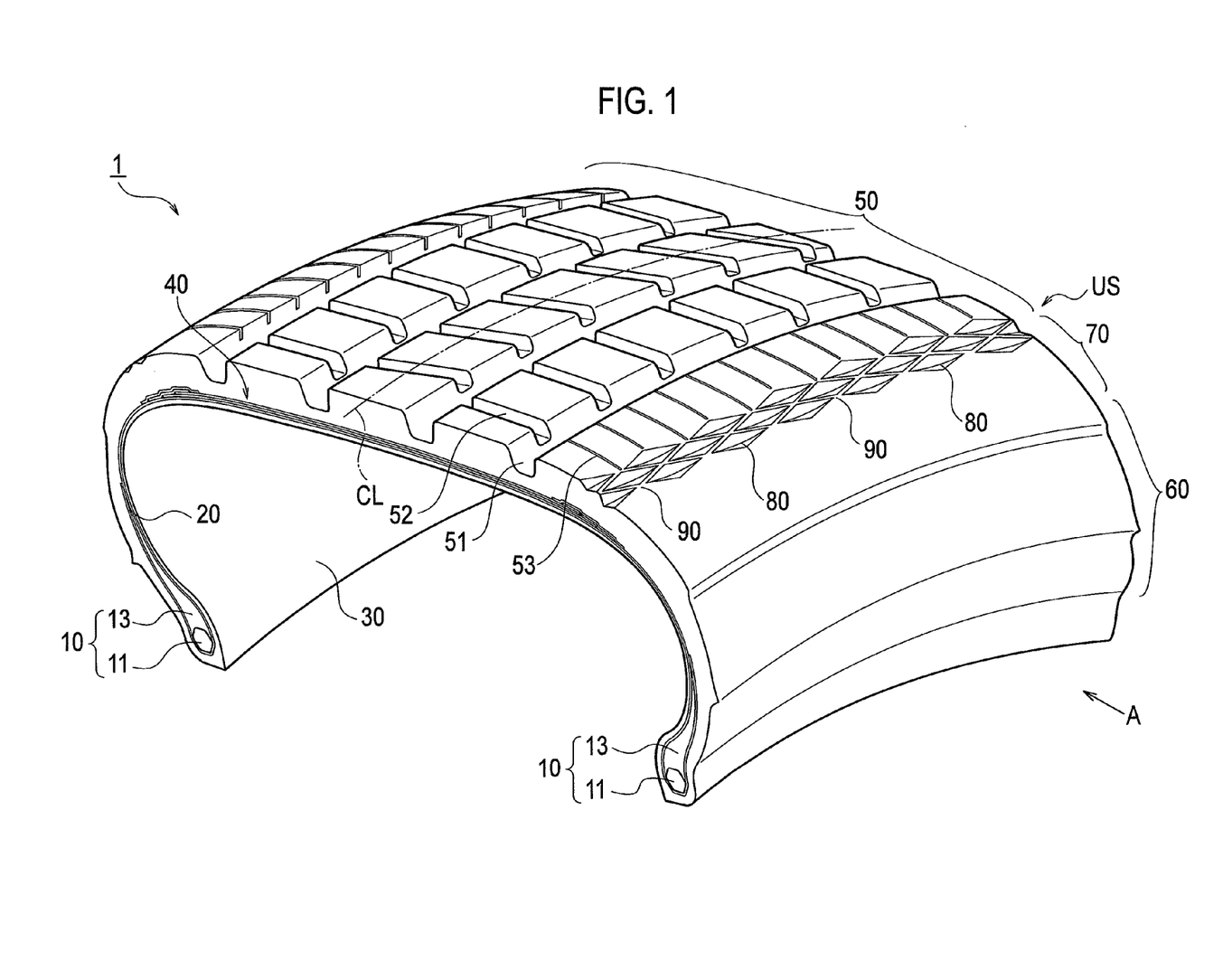
FIG. 1 is a perspective view illustrating a part of a pneumatic tire 1 according to a first embodiment.
Figure 2:
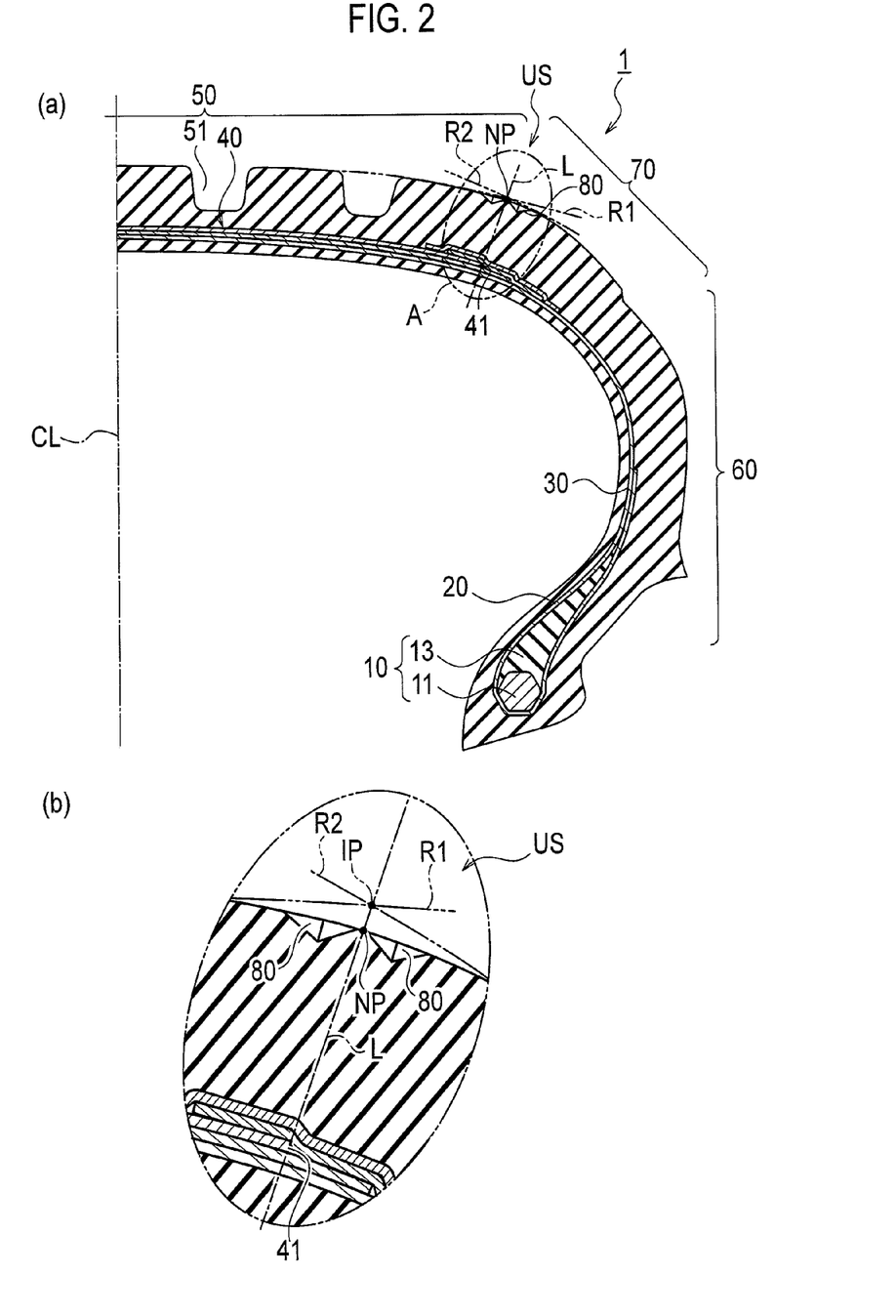
FIG. 2(a) is a cross-sectional view in the tread width direction of the pneumatic tire 1 according to the first embodiment.
FIG. 2(b) is an enlarged view illustrating an area enclosed by the double dot and dash line A of FIG. 2(a).

First, the overall configuration of the pneumatic tire 1 according to the first embodiment will be explained while referring to the drawings. FIG. 1 is a perspective view illustrating a part of the pneumatic tire 1 according to the first embodiment. FIG. 2(*a*) is a cross-sectional view in the tread width direction of the pneumatic tire 1 according to the first embodiment. FIG. 2(*b*) is an enlarged view illustrating an area enclosed by the double dot and dash line A of FIG. 2(*a*). Furthermore, the pneumatic tire 1 may be filled with, other than air, an inert gas such as nitrogen gas.

As illustrated in FIG. 1 and FIG. 2, the pneumatic tire 1 includes a bead portion 10, a carcass 20, an inner liner 30, a belt 40, a tread 50, sidewalls 60, and buttress portions 70.

The bead portion 10, when being fixed onto a rim (not illustrated), comes into contact with that rim. The bead portion 10 includes at least a bead core 11 and a bead filler 13. The bead core 11 is to be the core of the bead portion 10. The bead filler 13 is provided in the carcass 20 that is folded back along the bead core 11, and suppresses deformation of the bead portion 10.

The carcass 20 forms the framework of the pneumatic tire 1. The carcass 20 is folded back along the bead core 11, and provided from one bead core 11, through the inner side of the tread 50 in the tire radial direction TR, to the other bead core 11. The carcass 20 is configured of carcass cords and rubber.

The inner liner 30 is formed of a highly hermetic rubber layer which acts as a tube. The inner liner 30 is provided on the inner side of the carcass 20.

The belt 40 maintains the shape of the pneumatic tire 1 while reinforcing the tread 50. The belt 40 is provided on the outer side, in the tire radial direction TR, of the carcass 20. The belt 40 is provided in a plurality (an inner side belt layer, an outer side belt layer, and a cap layer), and each belt 40 is belt-shaped along the tire circumference direction TC.

The tread 50 has tread patterns that are formed and contacts the road surface. The tread 50 is provided on the outer side, in the tire radial direction TR, of the belt 40. On the tread 50, circumferential grooves 51 which extend along the tire circumference direction TC, and rug grooves 52 which extend along a direction intersecting with the circumferential grooves 51 (in the first embodiment, the tread width direction TW) are formed.

Of the tread 50, on the shoulder land portion positioned on the outermost side in the tread width direction TW, width directional thin grooves 53 extending along a direction intersecting with the circumferential grooves 51 (in the first embodiment, the tread width direction TW) are formed.

The side walls 60 are provided on the inner side, in the tire radial direction TR, of the tread 50, and are formed by the rubber layer that connects the bead portion 10 and the tread 50. The side walls 60 are provided on the outer sides, in the tread width direction TW, of the carcass 20.

The buttress portions 70 are provided between the tread 50 and the side walls 60, and are formed by the rubber layer in line with the tread 50 and the side walls 60. The buttress portions 70 are provided on the outer side, in the tire radial direction TR, of the carcass 20.

Here, between the tread 50 and the buttress portion 70, a recessed shoulder region US extending along the tire circumference direction TC is provided. In the first embodiment, the recessed shoulder region US is positioned on the inner side when the tire is mounted on the vehicle.

In the cross section, of the recessed shoulder region US, along the tread width directions TW and the tire radial direction TR (refer to FIG. 2), when the point where the first curved line R1 and the second curved line R2 intersect is defined as imaginary point IP, and the point where the straight line L, which is approximately perpendicular to the carcass 20 and passes through the imaginary point IP, and the surface of the pneumatic tire 1 intersects is defined as intersection point NP, the recessed shoulder region US includes the intersection point NP, and has a predetermined width (L1 described later) centered on the intersection point NP.

Furthermore, the first curved line R1, in accordance with the curvature of the surface of the tread 50, extends towards the outer side in the tread width direction TW. The second curved line R2, in accordance with the curvature of the surface of the buttress portion 70, extends towards the outer side in the tire radial direction TR. Also, the straight line L (intersection point NP) passes over the belt end 41 (refer to FIG. 2) positioned on the outer side, in the tread width direction TW, of the outer side belt layer out of the plurality of the belts 40.

(2) Detailed Configuration of Recessed Shoulder Region

Figure 3:
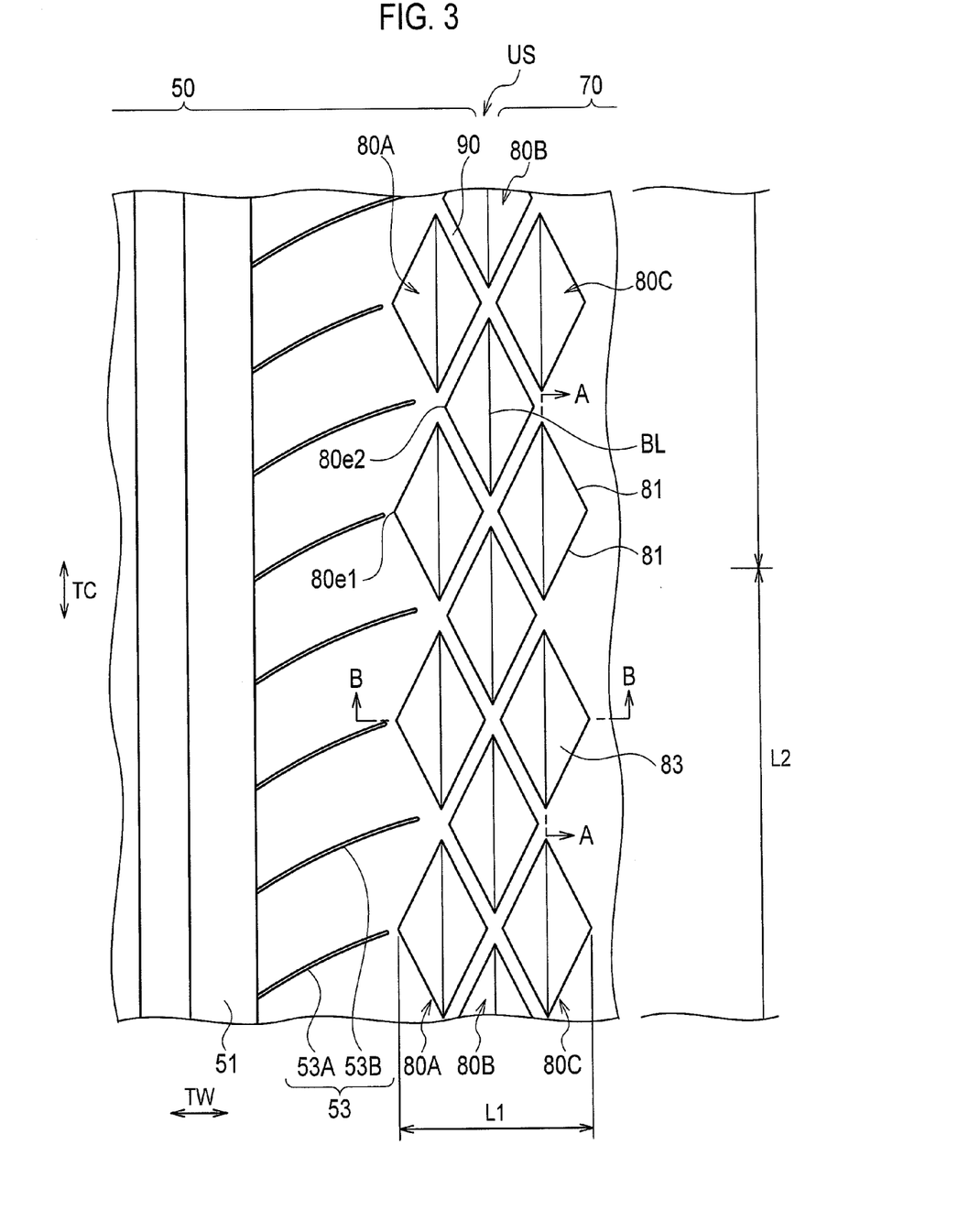
FIG. 3 is a tread developed view illustrating the area around a recessed shoulder region US according to the first embodiment.
Figure 4:
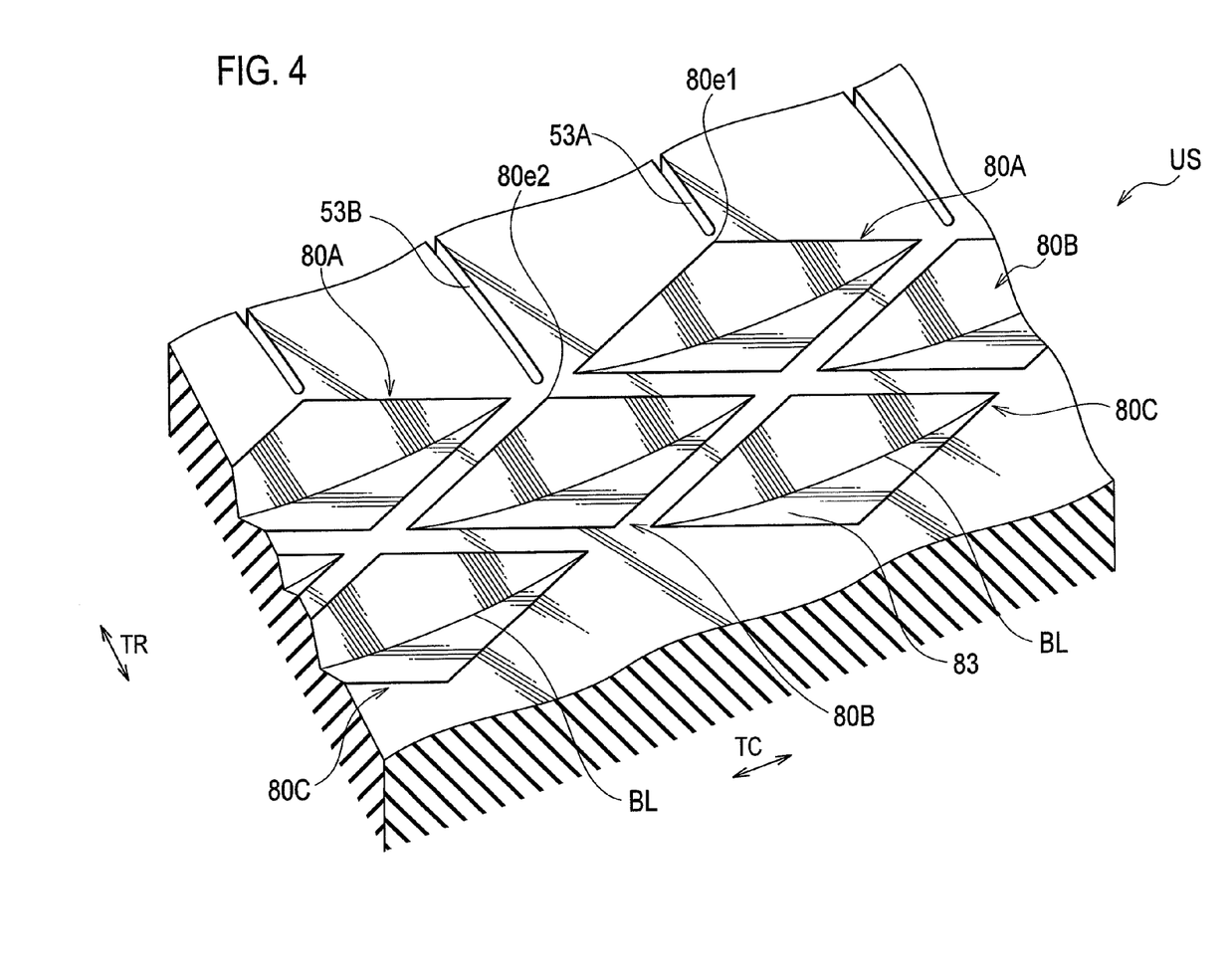
FIG. 4 is a perspective view illustrating the area around the recessed shoulder region US according to the first embodiment.
Figure 5:
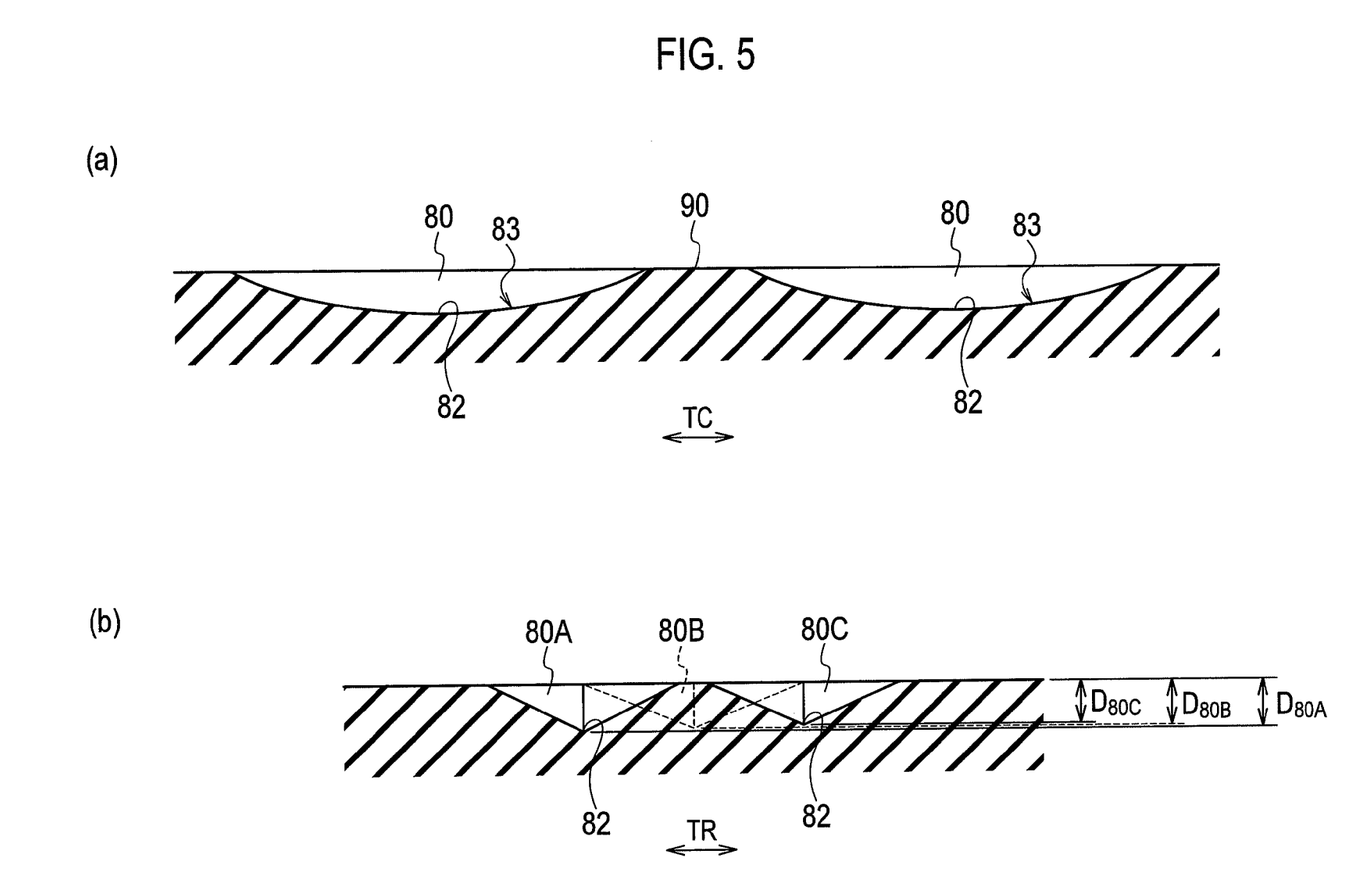
FIG. 5(a) is a cross-sectional view of A-A of FIG. 3.
FIG. 5(b) is a cross-sectional view of B-B of FIG. 3.

Next, the detailed configuration of the recessed shoulder region US mentioned above will be explained while referring to FIG. 1 through FIG. 5. Furthermore, FIG. 3 is a tread developed view illustrating the area around the recessed shoulder region US according to the first embodiment. FIG. 4 is a perspective view illustrating the area around the recessed shoulder region US according to the first embodiment. FIG. 5(*a*) is a cross-sectional view of A-A of FIG. 3, and FIG. 5(*b*) is a cross-sectional view of B-B of FIG. 3.

As illustrated in FIG. 1 through FIG. 5, the recessed shoulder region US is configured of a plurality of recessed portions 80 and a surface portion 90. In other words, on the recessed shoulder region US, a plurality of recessed portions 80 are formed.

(2-1) Configuration of Recess

The recessed portion 80 is recessed from the surface of the pneumatic tire 1. The ratio of the area occupied by the recessed portions 80 in the recessed shoulder region US is equal to or greater than 60%. For example, when the recessed shoulder region US is 170 to 200 mm$^2$, the ratio of the area occupied by the recessed portions 80 in the recessed shoulder region US is 100 to 160 mm$^2$ (in the first embodiment, 154 mm$^2$).

The recessed portion 80 is, in the tread width direction TW (in other words, the direction going from the tread 50 to the side walls 60), formed in a plurality (in the figure, three rows). Specifically, the recessed portion 80 is configured of a recessed portion 80A, a recessed portion 80B, and a recessed portion 80C, from the tread 50 to the side wall 60.

The recessed portion 80A is provided in a position that is substantially the same, in the tire circumference direction TC, as the recessed portion 80C. An end 80e1 of the recessed portion 80A which is positioned on the innermost side, in the tread width direction TW, is provided in a position that is substantially the same, in the tire circumference direction TC, as a short thin groove 53A of the width directional thin grooves 53 (refer to FIG. 3 and FIG. 4).

The recessed portion 80B is provided in a position that is shifted by a half-phase, in the tire circumference direction TC, from the recessed portion 80A and the recessed portion 80C. An end 80e2 of the recessed portion 80B which is positioned on the innermost side, in the tread width direction TW, is provided in a position that is substantially the same, in the tire circumference direction TC, as the long thin groove 53B, of the width directional thin grooves 53, which is longer in the tread width direction TW than the short thin groove 53A (refer to FIG. 3 and FIG. 4).

A depth D of the recessed portion 80 is set to be 0.5 to 3.0 mm. Specifically, the depth $D_{80C}$ of the recessed portion 80C formed on the outer side, in the tread width direction TW (by the side wall 60), is less than a depth $D_{80A}$ of the recessed portion 80A formed on the inner side, in the tread width direction TW (by the tread 50). A depth $D_{80B}$ of the recessed portion 80B positioned between the recessed portion 80A and the recessed portion 80C is preferably greater than the depth $D_{80A}$ of the recessed portion 80A, while being less than the depth $D_{80C}$ of the recessed portion 80C. When the entire area of such recessed portions 80 is represented by s, and the depth of a deepest portion 82 of the recessed portions 80 is represented by D, the relation of $\sqrt{s} \geq D$ is satisfied.

On the surface (the perspective of arrow A in FIG. 1, in other words, the top surface view of the recessed portions 80) of the pneumatic tire 1, the recessed portion 80 is polygonal. In the first embodiment, the recessed portion 80 is quadrilateral, or specifically, rhombic. Also, sides 81 (in the first embodiment, four sides) that form the recessed portion 80 are slanted in relation to the tire circumference direction TC. The number of line segments BL (in the first embodiment, one) formed on a bottom surface 83 of the recessed portion 80 along the deepest portion 82 of the recessed portion 80 is less than the number of the sides 81 that form the recessed portion 80.

Line segments BL are formed in a position which is a diagonal of the recessed portion 80 (rhombus) along the tire circumference direction TC. The line segments BL are curved in the bottom surface 83 of the recessed portion 80 (refer to FIG. 5(a)). For example, the line segments BL are configured to be 15 to 36 mm. Also, the bottom surfaces 83 of the recessed portion 80 are each inclined towards the deepest portion 82 (refer to FIG. 5(b)).

(2-2) Configuration of Surface Portion

As illustrated in FIG. 3 and FIG. 4, the surface portion 90 is a portion where the recessed portions 80 are not formed. The surface portion 90 is formed surrounding each of the recessed portions 80. In the surface of the pneumatic tire 1, the surface portion 90 is latticed.

(2-3) Relation Between Recessed Portions and Surface Portion

As illustrated in FIG. 3 through FIG. 5, when the width of the recessed shoulder region US along the tire radial direction TR is represented by L1, the length of the recessed shoulder region US along the tire circumference direction TC is represented by L2, the volume of the recessed portion 80 is represented as V, and the depth of the deepest portion 82 of the recessed portion 80 is represented by D, the relation of $V \geq L1 \cdot L2 \cdot (D/2)$ is satisfied.

Here, the width of the recessed shoulder region US indicates, from the end 80e1 of the recessed portion 80A positioned on the innermost side in the tread width direction TW, to an end 80e3 of the recessed portion 80C positioned on the outermost side in the tread width direction TW.

(3) Comparative Evaluations

Next, to further clarify the effects of the present invention, comparative evaluations, performed using pneumatic tires according to examples and a comparative example below, will be explained. Specifically, (3-1) Configuration of each pneumatic tire and (2) Evaluation results will be explained. Furthermore, the present invention is in no way limited by these examples.

(3-1) Configuration of Each Pneumatic Tire

First, the pneumatic tires according to the examples and the comparative example will be briefly explained. Furthermore, data according to the pneumatic tires were measured under the conditions laid out below.

Tire Size: 215/55R17

Rim Size: 7J-17

On the pneumatic tire according to the comparative example, the recessed portions 80 are not formed. In the recessed shoulder region US of the pneumatic tires according to the examples 1 to 3, the recessed portions 80 and the surface portion 90 are formed. Furthermore, with the pneumatic tires according the examples 1 to 3, the ratios of the area occupied by the recessed portions 80 in the recessed shoulder region US are each different.

(3-2) Evaluation Results

Next, evaluation results of the road noise (actual car and interior drum) of each pneumatic tire will be explained while referring to Table 1.

TABLE 1

|  | Comparative Example | Example 1 | Example 2 | Example 3 |
|---|---|---|---|---|
| Ratio of recessed portions | 0 | 40% | 60% | 80% |
| 1 Feeling evaluation of noise in actual car | 100 | 100 | 105 | 105 |
| 2 Evaluation of interior drum | 100 | 104 | 106 | 108 |

(3-2-1) Road Noise (Actual Car)

Under the condition of the proper internal pressure and load of one driver+600N, a vehicle (domestic, 2-liter engine) fitted with each of the pneumatic tires was driven on a test course, and by setting the road noise of the pneumatic tire according to the comparative example as '100', road noise of the other pneumatic tires underwent a feeling evaluation. Furthermore, the greater the value of the index, the superior the effects of reducing road noise are.

As a result of this, it was determined that the vehicles fitted with the pneumatic tires 1 according to the examples 1 to 3, when compared to the vehicle fitted with the pneumatic tire according to the comparative example, could exhibit effects in reducing road noise. Especially, in the pneumatic tire 1 according to the examples 2 and 3, as effects in reducing road noise are further exhibited, it was determined that it was preferable that the ratio of the area occupied by the recessed portions 80 in the recessed shoulder region US is equal to or greater than 60%.

(3-2-2) Road Noise (Interior Drum)

Under the condition of an internal pressure at 210 kPa and a load of 4.81 kN, an experimenting drum fitted with each of the pneumatic tires was spun, and by setting the sound pressure level (O.A. value) of the road noise of the pneumatic tire according to the comparative example as '100', the sound pressure levels of the road noise of the other pneumatic tires were evaluated. Furthermore, the greater the value of the index, the superior the effects of reducing road noise are.

As a result of this, it was determined that the vehicles fitted with the pneumatic tires 1 according to the examples 1 to 3, when compared to the vehicle fitted with the pneumatic tire according to the comparative example, could exhibit effects in reducing road noise. Especially, it was determined that with the pneumatic tire 1 according to the examples 2 and 3, as the ratio of the area occupied by the recessed portions 80 in the recessed shoulder region US is equal to or greater than 60%, effects in reducing road noise could be further exhibited.

(4) Operation and Effect

In general, the buttress portion, which does not contact the road surface when the road surface is smooth, contacts the road surface when there are small dents and bumps on the road surface, such as a paved road with a rough road surface. Due to these dents and bumps, the buttress portion vibrates, and road noise due to this vibration of the buttress portion is increased. However, in the first embodiment, a recessed shoulder region US having a predetermined width extends along the tire circumference direction TC, and in the recessed shoulder region US, a plurality of recessed portions 80 and the surface portion 90 are formed. Due to this, even when there are small dents and bumps on the road surface, the recessed portions 80 do not contact the dents and bumps of the road surface, and the area of the recessed shoulder region US that contacts the road surface is reduced. Due to this, the increase of the contact pressure of the tread 50 is suppressed, and the vibration of the recessed shoulder region US caused by the dents and bumps of the road surface can be suppressed. Accordingly, the generation of road noise due to the vibration of the recessed shoulder region US can be suppressed, and as a result, the pneumatic tire 1 further reducing road noise can be provided.

Especially, when compared to when the ratio of the area occupied by the recessed portions 80 in the recessed shoulder region US is less than 60%, suppression of the decrease in shearing rigidity of the recessed shoulder region US, and the reduction of the area of the recessed shoulder region US which contacts the road surface, can both be managed. Due to this, while suppressing the generation of road noise, qualities such as controlling stability and cornering performance can be maintained.

For example, when the recessed shoulder region US is 170 to 200 mm², the ratio of the area occupied by the recessed portions 80 in the recessed shoulder region US is 100 to 160 mm² (in the first embodiment, 154 mm²). Furthermore, when the related ratio is less than 100 mm², there are cases where the dents and bumps of the road surface may contact the recessed portions 80. On the other hand, when the related ratio is more than 160 mm², there are cases where the decrease in shearing rigidity of the recessed shoulder region US cannot be suppressed.

In the first embodiment, the relation of $V \geq L1 \cdot L2 \cdot (D/2)$ is satisfied. By this, when compared to cases where V is less than $L1 \cdot L2 \cdot (D/2)$, suppression of the decrease in shearing rigidity of the recessed shoulder region US, and the reduction of the area of the recessed shoulder region US which contacts the road surface, can both be managed. Due to this, while suppressing the generation of road noise, qualities such as controlling stability and cornering performance can be maintained.

In the first embodiment, the surface portion 90 is formed surrounding each of the recessed portions 80. By this, suppression of the excessive decrease in rigidity of the recessed shoulder region US can be further ensured. Due to this, while suppressing the generation of road noise, qualities such as controlling stability and cornering performance can be maintained.

In the first embodiment, the recessed portion 80 is polygonal. By this, compared to when the recessed portion 80 is circular or oval-shaped, the recessed portions 80 can be arranged more efficiently in the recessed shoulder region US, further ensuring the suppression of the generation of road noise.

In the first embodiment, the sides 81 that form the recessed portion 80 are slanted in relation to the tire circumference direction TC. By this, when compared to cases where the sides 81 are along the tire circumference direction TC, it is harder for cracks to progress in the tire circumference direction TC, and suppression of the progression of cracks can be ensured.

In the first embodiment, the number of line segments BL formed on the bottom surface 83 of the recessed portion 80 along the deepest portion 82 of the recessed portion 80 is less than the number of the sides 81 that form the recessed portion 80. By this, when compared to cases where the number of line segments BL is greater than the number of sides 81, suppression of the decrease in shearing rigidity of the recessed shoulder region US, and the reduction of the area of the recessed shoulder region US which contacts the road surface, can both be managed. Due to this, while suppressing the generation of road noise, qualities such as controlling stability and cornering performance can be maintained. Furthermore, when compared to cases where the number of line segments BL is greater than the number of sides 81, the generation of cracks in the deepest portion 82 of the recessed portion 80 can also be suppressed.

In the first embodiment, the line segments BL are curved in the bottom surface 83 of the recessed portion 80 (refer to FIG. 5(a)). Also, the bottom surfaces 83 of the recessed portion 80 are each inclined towards the deepest portion 82 (refer to FIG. 5(b)). By this, the root portion of the surface portion 90 can be reinforced, suppressing the decrease in shearing rigidity of the recessed shoulder region US. Due to this, while suppressing the generation of road noise, qualities such as controlling stability and cornering performance can be maintained.

In the first embodiment, the recessed portion 80 is rhombic. Also, the line segments BL are formed in a position which is a diagonal of the recessed portion 80 (rhombus) along the tire circumference direction TC. By this, the line segments BL along the tire circumference direction TC can be arranged to be longer. For this reason, the recessed portions 80 can be arranged more efficiently in the recessed shoulder region US which is limited in the tire radial direction TR, and suppression of the decrease in shearing rigidity of the recessed shoulder region US, and the reduction of the area of the recessed shoulder region US which contacts the road surface, can both be managed. Due to this, while suppressing the generation of road noise, qualities such as controlling stability and cornering performance can be maintained.

In the first embodiment, the surface portion 90 is latticed. By this, the sides 81 that form the recessed portion 80 are not in line in the tire circumference direction TC, making it harder for cracks to progress in the tire circumference direction TC, further ensuring the suppression of the progression of cracks.

In the first embodiment, the depth $D_{80c}$ of the recessed portion 80C is less than the depth $D_{80A}$ of the recessed portion 80A. In other words, the depth $D_{80A}$ of the recessed portion 80A is greater than the depth $D_{80c}$ of the recessed portion 80C. By this, as it is easier for the side towards the tread 50 in the recessed shoulder region US to contact the road surface, by the recessed portion 80A, formed closer to the tread 50 which contacts the road surface more easily, being deeper, it becomes harder for the bumped portions of the dents and bumps on the road surface to contact the bottom surface 83 of the recessed portion 80A. For this reason, suppression of the generation of road noise can be further ensured.

In the first embodiment, the recessed shoulder region US includes the intersection point NP. In other words, the recessed shoulder region US is provided on the inner side, in the tread width direction TW, and the outer side, in the tread width direction TW, of the intersection point NP. By this, it is even harder for the dents and bumps of the road surface to contact the recessed portions 80, and the area of the recessed shoulder region US which contacts the road surface is reduced.

In general, as the pneumatic tire 1 is often mounted on vehicles with assigned with a negative camber angle, the recessed shoulder region US on the inner side, when the tire is mounted on the vehicle, is easier to come into contact with the road surface, in a situation where the related negative camber angle is assigned, when compared to the outer side when the tire is mounted on the vehicle. However, in the first embodiment, the recessed shoulder region US is positioned on the inner side when the tire is mounted on the vehicle. By this, the generation of road noise in the case of the inner side, when the tire is mounted on the vehicle, can be suppressed.

In the first embodiment, the end 80e1 of the recessed portion 80A is provided in a position that is substantially the same, in the tire circumference direction TC, as the short thin groove 53A. Also, the end 80e2 of the recessed portion 80B is provided in a position that is substantially the same, in the tire circumference direction TC, as the long thin groove 53B. By this, the land portion where the recessed portions 80 and the width directional thin grooves 53 are not locally formed (in other words, the surface portion 90) is prevented from becoming too large. For this reason, while suppressing the generation of road noise, the occurrence of uneven wear due to rigidity differences can also be suppressed.

In the first embodiment, the relation of $\sqrt{s} \geq D$ is satisfied. By this, when compared to cases where the relation is $\sqrt{s} < D$, the suppression of the decrease in shearing rigidity of the recessed shoulder region US, and the reduction of the area of the recessed shoulder region US which contacts the road surface, can both be managed. Due to this, while suppressing the generation of road noise, qualities such as controlling stability and cornering performance can be maintained.

(5) Modifications

Next, modifications of the recessed portion 80 of the pneumatic tire 1 according to the first embodiment described above will be explained while referring to the drawings. Furthermore, to portions identical to the recessed portion 80 of the pneumatic tire 1 according to the first embodiment described above, identical numerals are assigned, and the description will be made by focusing on the differences.

(5-1) First Modification

Figure 6:
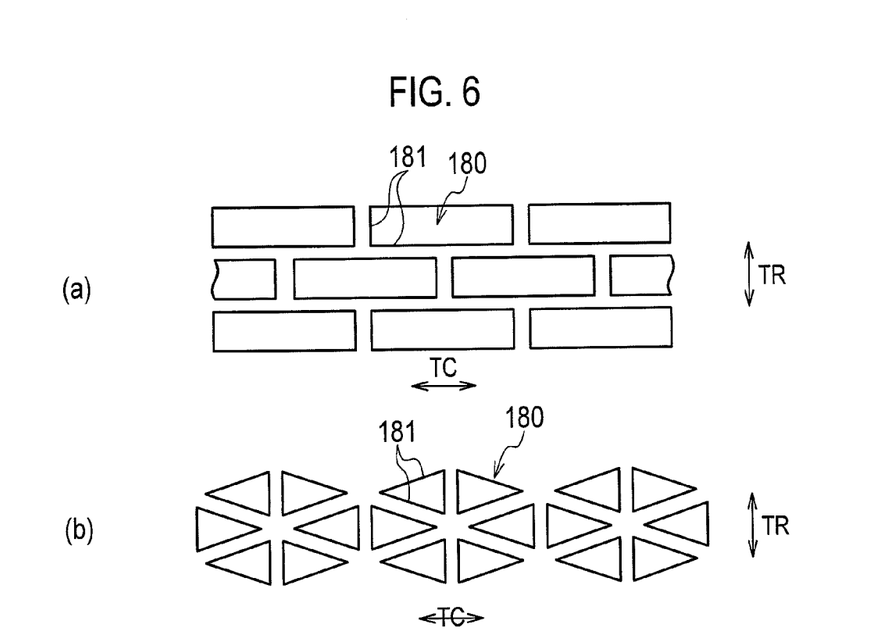
FIG. 6 is a tread developed view illustrating the area around the recessed shoulder region US according to a first modification.

First, the configuration of a recessed portion 180 of the pneumatic tire 1 according to a first modification will be explained while referring to the drawings. FIG. 6 is a tread developed view illustrating the area around the recessed shoulder region US according to the first modification.

In the first embodiment described above, the recessed portion 80 is rhombic, and the sides 81 that form the recessed portion 80 are slanted in relation to the tire circumference direction TC. In contrast, in the first modification, as illustrated in FIG. 6(*a*), the recessed portion 180 is rectangular. Also, the sides 181 that form the recessed portion 180 are provided along the tire circumference direction TC or the tire radial direction TR.

Also, the recessed portion 180 is not necessarily required to be rectangular, and as illustrated in FIG. 6(*b*), may be triangular, and the shape of the recessed portion 180 may be appropriately varied to correspond to different purposes.

(5-2) Second Modification

Figure 7:
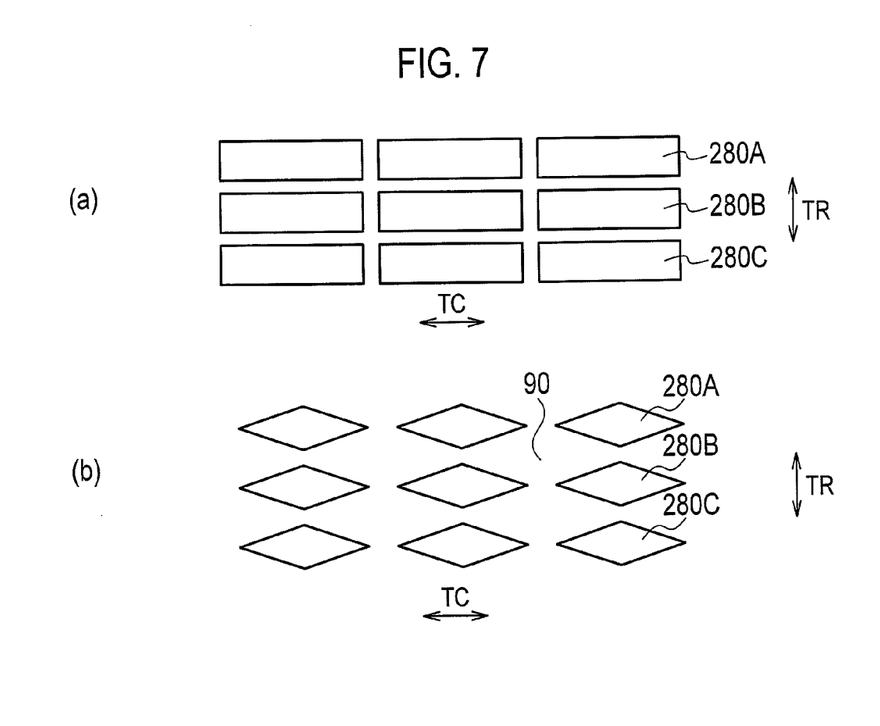
FIG. 7 is a tread developed view illustrating the area around the recessed shoulder region US according to a second modification.

Next, the configuration of a recessed portion 280 of the pneumatic tire 1 according to a second modification will be explained while referring to the drawings. FIG. 7 is a tread developed view illustrating the area around the recessed shoulder region US according to the second modification.

In the first embodiment described above, the recessed portion 80B is provided in a position shifted, in the tire circumference direction TC, from that of the recessed portion 80A and the recessed portion 80C. In contrast, in the second modification, as illustrated in FIG. 7(*a*) and FIG. 7(*b*), a recessed portion 280A, a recessed portion 280B, and a recessed portion 280C are provided in such a way that they are lined up in the tire circumference direction TC. Furthermore, with the recessed portions 280 illustrated in FIG. 7(*b*), the surface portion 90 does not necessarily have to be formed surrounding each of the recessed portions 280, and may be provided as a predetermined region between the adjacent recessed portions 280.

(5-3) Third Modification

Figure 8:
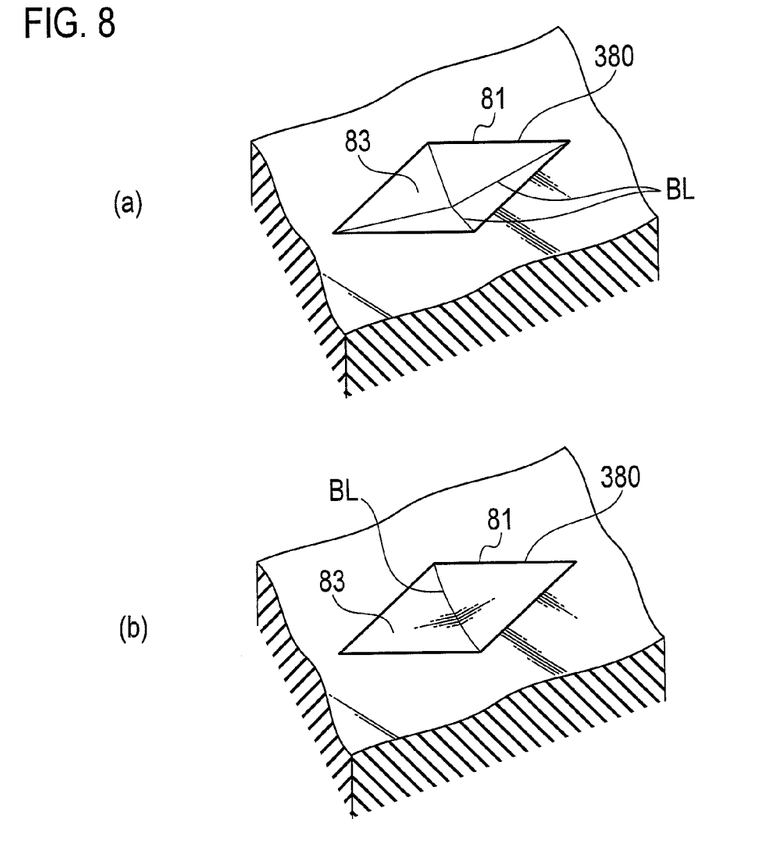
FIG. 8 is a perspective view illustrating the area around the recessed shoulder region US according to a third modification (part 1).

Next, the configuration of a recessed portion 380 of the pneumatic tire 1 according to a third modification will be explained while referring to the drawings. FIG. 8 is a perspective view illustrating the area around the recessed shoulder region US according to the third modification.

In the first embodiment described above, the number of the line segments BL (, which is one) is less than the number of the sides 81 that form the recessed portion 80. In contrast, in the third modification, as illustrated in FIG. 8(*a*), the number of the line segments BL is equal to the number of the sides 81 that form the recessed portion 380. In this case, the line segments BL may be curved in the bottom surface 83 of the recessed portion 380, or may be linear.

Also, the number of line segments BL is not necessarily required to be equal to the number of the sides 81, and may be greater than the number of the sides 81. Also, as illustrated in FIG. 8(*b*), the line segments BL do not have to be formed in a position as a diagonal (of the rhombus) along the tire circumference direction TC, and of course may be formed in a position as a diagonal along the tire radial direction TR. In this case, for example, the line segments BL are configured to be 7 to 18 mm.

Figure 9:
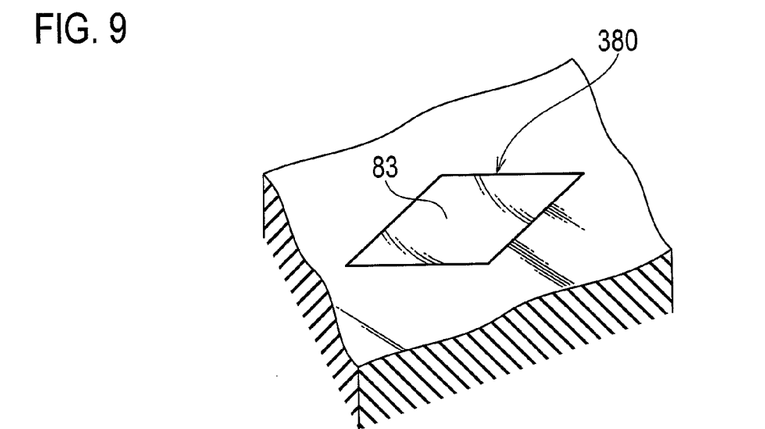
FIG. 9 is a perspective view illustrating the area around the recessed shoulder region US according to the third modification (part 2).

Also, the line segments BL are not necessarily required to be provided, and as illustrated in FIG. 9, may not be provided. In this case, the bottom surface 83 of the recessed portion 380 is formed by only a curved surface. In this case, when compared to cases where the bottom surfaces 83 of the recessed portion 380 are formed linearly, the stress focusing on the bottom surface 83 is dispersed. For this reason, while suppressing the generation of road noise, the generation of cracks on the bottom surface 83 can also be suppressed.

[Second Embodiment]

In the following, the configuration of the recessed shoulder region US of the pneumatic tire 1A according to a second embodiment will be explained while referring to the drawings. Furthermore, to portions identical to the pneumatic tire 1 according to the first embodiment described above, identical numerals are assigned, and the description will be made by focusing on the differences.

Figure 10:
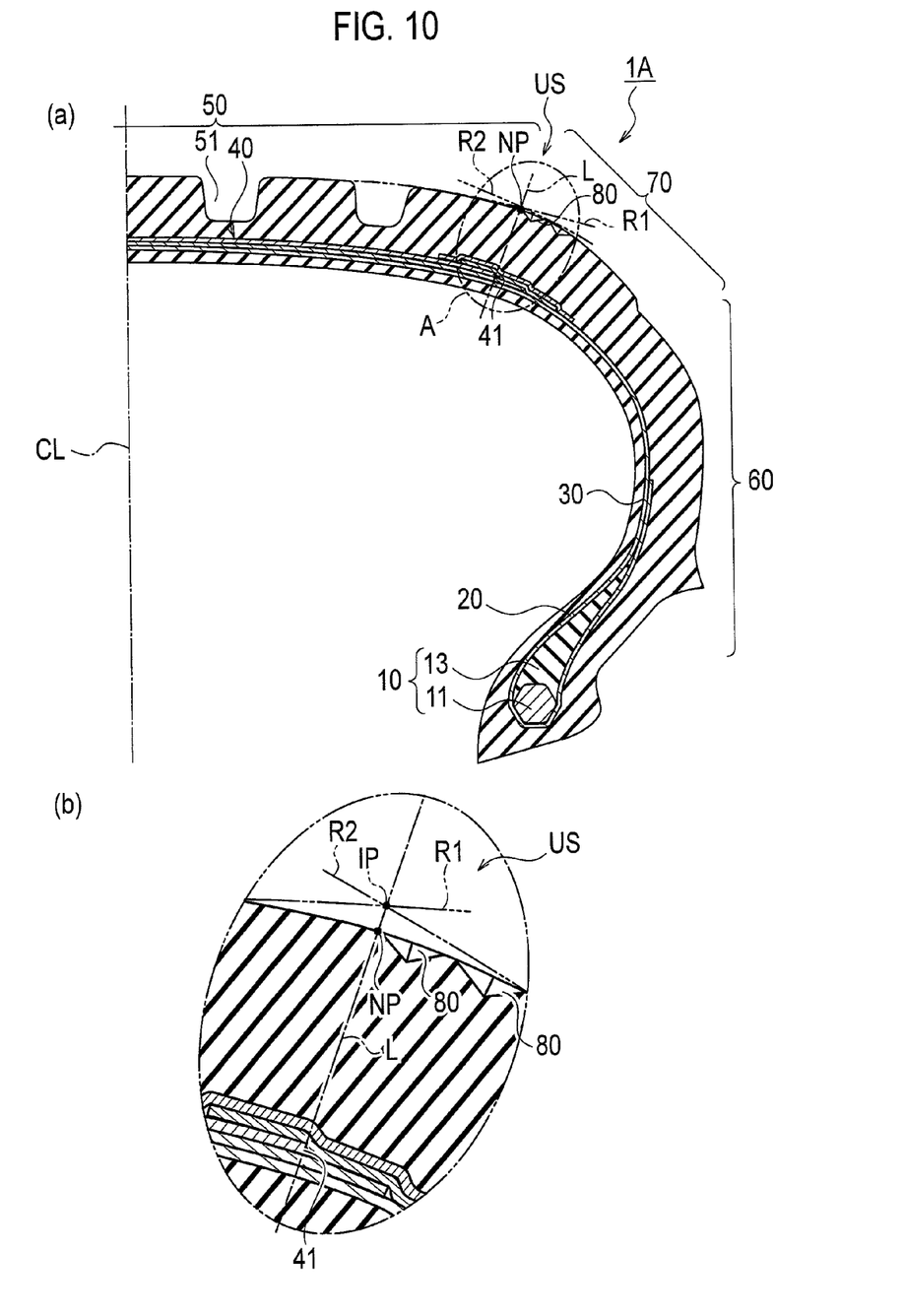
FIG. 10(a) is a cross-sectional view in the tread width direction of a pneumatic tire 1A according to the second embodiment.
FIG. 10(b) is an enlarged view illustrating an area enclosed by the double dot and dash line A of FIG. 10(a).

FIG. 10(*a*) is a cross-sectional view in the tread width direction of the pneumatic tire 1A according to the second embodiment. FIG. 10(*b*) is an enlarged view illustrating an area enclosed by the double dot and dash lined area A of FIG. 10(*a*).

In the first embodiment mentioned above, the recessed shoulder region US includes the intersection point NP, and has a predetermined width (L1) centered on the intersection point NP. In contrast, in the second embodiment, as illustrated in FIG. 10, the recessed shoulder region US is positioned on the inner side, in the tire radial direction TR, of the intersection point NP.

In the second embodiment like this, by the recessed shoulder region US being positioned on the inner side, in the tire radial direction TR, of the intersection point NP, the chances of the recessed shoulder region US (surface portion 90) contacting the dents and bumps of the road surface are lessened, and the suppression of the generation of road noise can be further ensured.

[Other Embodiments]

As mentioned above, although the content of the present invention was disclosed through the embodiments of the present invention, the descriptions and drawings that form a part of this disclosure are not to be defined as limitation to the present invention. From this disclosure, various alternate embodiments, examples, and operation technology will become apparent to one skilled in the art.

For example, the embodiments of the present invention may be altered in the following ways. Specifically, as the tire, although the pneumatic tire 1 filled with air or nitrogen gas is explained, this is not a limitation, and may be a solid tire that is not filled with air or nitrogen gas.

Also, the configuration of the pneumatic tire 1 is not limited to that explained in the embodiments, and of course may be appropriately configured to correspond to different purposes. For example, configurations and the like of the bead portion 10, the carcass 20, the belt 40, and the tread 50 may be appropriately configured to correspond to different purposes.

Also, the recessed shoulder region US, although explained as being positioned on the inner side when the tire is mounted on the vehicle, this is not a limitation, and may be positioned on the outer side, when the tire is mounted on the vehicle, or may be positioned on both the inner and outer sides, when the tire is mounted on the vehicle.

Also, the ratio of the area occupied by the recessed portions 80 in the recessed shoulder region US, although explained as being equal to or greater than 60%, this is not a limitation, and may be less than 60%.

Also, although explained as satisfying the relation of $V \geq L1 \cdot L2 \cdot (D/2)$, this is not a limitation, and may not satisfy the relation of $V \geq L1 \cdot L2 \cdot (D/2)$. Also, the straight line L (intersection point NP), although explained as passing over the belt end 41 of the outer side belt layer, this is not a limitation, as long as it passes near the belt end 41

Also, the recessed portion 80, although explained as being polygonal, this is not a limitation, and may be circular. Also, the line segments BL, although explained as being curved in the bottom surface 83 of the recessed portion 80, this is not a limitation, and may be linear.

Also, the recessed portion 80, although explained as being formed in a plurality (in three rows) in the direction going from the tread 50 to the side walls 60, this is not a limitation, and may be formed in a single row, and appropriately configured to correspond to different purposes.

Also, the depth $D_{80C}$ of the recessed portion 80C, although explained as being less than the depth $D_{80A}$ of the recessed portion 80A, this is not a limitation, and may be equal to the depth $D_{80A}$ of the recessed portion 80A, or may be greater than the depth $D_{80A}$ of the recessed portion 80A.

Also, the surface portion 90, although being described as latticed, this is not a limitation, and may be of a shape other than a lattice.

As described above, needless to say, the present invention includes various embodiments and the like not described here. Therefore, the technical range of the present invention is to be defined only by the inventive specific matter according to the adequate claims from the above description.

The entire contents of Japanese Patent Application Laid-open No. 2009-200815 (filed on Aug. 31, 2009) and Japanese Patent Application Laid-open No. 2010-006954 (filed on Jan. 15, 2010) are incorporated in the present specification by reference.

INDUSTRIAL APPLICABILITY

As stated above, it is possible to suppress the generation of road noise due to the vibration of the buttress portion, and therefore, the present invention can be applied to tires that demand reduction of noise.

REFERENCE NUMERAL

1 . . . pneumatic tire, 10 . . . bead portion, 11 . . . bead core, 13 . . . bead filler, 20 . . . carcass, 30 . . . inner liner, 40 . . . belt, 41 . . . belt end, 50 . . . tread, 51 . . . circumferential groove, 52 . . . rug groove, 53 . . . width directional thin groove, 53A . . . short thin groove, 53B . . . long thin groove, 60 . . . sidewall, 70 . . . buttress portion, 80 (80A~80C), 180, 280, 380 . . . recess, 80e1, 80e2 . . . end, 81, 181 . . . side, 83 . . . bottom surface, 90 . . . surface portion, US . . . recessed shoulder region, BL . . . line segment, IP . . . imaginary point, L . . . straight line, C1 . . . curved line, C2 . . . curved line, NP . . . intersection point

The invention claimed is:

1. A tire, comprising:
a tread which contacts a road surface and is provided on an outer side of the carcass in a tire radial direction; side walls provided on an inner side of the tread in the tire radial direction; and a buttress portion provided between the tread and the side walls, and does not contact a smooth road surface when the road surface is smooth and a proper internal pressure and a proper load are applied to the tire,
wherein a recessed shoulder region is provided on the buttress portion, the recessed shoulder region having a predetermined width and extending along the tire circumference direction, and on the recessed shoulder region, formed are a plurality of recessed portions recessed from a surface of the tire, and a surface portion where the recessed portions are not formed, the recessed portion is formed in a plurality in a tread width direction and the tire circumference direction,
a ratio of an area occupied by the recessed portions in the recessed shoulder region is equal to or greater than 60%,
in the surface of the tire, a width of the recessed shoulder region along the tire radial direction is represented by L1, and a length of the recessed shoulder region along the tire circumference direction is represented by L2,
a volume of the recessed portions is represented by V, and a depth of a deepest portion of the recessed portions is represented by D,
the relation of $V \geq L1 \cdot L2 \cdot (D/2)$ is satisfied,
the recessed portion is polygonal on the surface of the tire, and a side forming the recessed portion is slanted in relation to the tire circumference direction, and
wherein an end of the recessed portion positioned on an innermost side of the recessed shoulder region in the tread width direction is provided in a position, in the circumferential direction, that is substantially the same as a short thin groove.

2. The tire according to claim 1, wherein the surface portion is formed surrounding each of the recessed portions.

3. The tire according to claim 2, wherein the surface portions are latticed on the surface of the tire.

4. The tire according to claim 1, wherein the number of line segments formed on a bottom surface of the recessed portion along a deepest portion of the recessed portion is less than the number of sides forming recessed portion.

5. The tire according to claim 1, wherein a bottom surface of the recessed portion is formed by only a curved surface.

6. The tire according to claim 1, wherein the recessed portion is quadrilateral.

7. The tire according to claim 6, wherein line segments formed on the bottom surfaces of the recessed portion along a deepest portion of the recess, are formed in a position which is a diagonal along the tire circumference direction.

8. The tire according to claim 1, wherein a depth of the recessed portions formed on the outer side in the tread width direction, is less than a depth of the recessed portions formed on the inner side in the tread width direction.

9. The tire according to claim 1, wherein the recessed shoulder region is positioned on an inner side of the tire mounted on a vehicle.

\* \* \* \* \*